Patented Oct. 10, 1939

2,176,018

UNITED STATES PATENT OFFICE 2,176,018

PRODUCTION OF ALKYL AND ARALKYL CYANOACETIC ESTERS

Arthur C. Cope, Bryn Mawr, Pa., Walter H. Hartung, Baltimore, Md., and Frank S. Crossley, Philadelphia, Pa., assignors to Sharp & Dohme, Incorporated, (1929), Philadelphia, Pa., a corporation of Maryland No Drawing. Application October 15, 1936, Serial No. 105,824

7 Claims. (Cl. 260—464)

This invention relates to a new process for the production of mono-alkyl or aralkyl cyanoacetic esters, including both the primary and secondary derivatives. It is of particular advantage for the production of the higher mono-alkyl derivatives, such as the hexyl, heptyl, octyl, etc., and even higher derivatives, including both straight and branched chain alkyl derivatives. In general, the alkyl and aralkyl derivatives which are produced are saturated, except, of course, for benzene radicals and the like which they may contain.

In accordance with the present invention, the mono-alkyl or aralkyl derivatives of cyanoacetic ester are produced by the catalytic hydrogenation of the corresponding alkylidene, or aralkylidene compounds. These alkylidene or aralkylidene compounds, whether primary or secondary, may be produced in any suitable manner; but are advantageously produced in accordance with the process described in an application of Arthur C. Cope, Serial No. 105,825, filed October 15, 1936, which describes the production of such compounds by the condensation of an aldehyde or a ketone with a cyanoacetic ester in the presence of a condensing agent consisting of a soluble salt.

The process of the present invention makes it possible to produce almost any desired mono-alkyl or aralkyl cyanoacetic ester, including both the secondary and the primary derivatives, as it is applicable to the catalytic hydrogenation of any available alkylidene or aralkylidene cyanoacetic ester.

Various catalysts, including platinum and palladium catalysts, may be used for the hydrogenation of the alkylidene cyanoacetic esters. A catalyst which is particularly advantageous for the hydrogenation is palladium supported on charcoal. This catalyst may be prepared, for example, by agitating a powdered charcoal, such as pure animal charcoal, with an aqueous solution of palladium chloride in an atmosphere of hydrogen. A suitable proportion is about 1 part of palladium chloride to 6 parts of charcoal. Agitation should be continued until the palladium chloride is reduced and the palladium is deposited on the charcoal. The catalyst may then be filtered off, washed and dried. It is then ready for immediate use in the process, or it may be kept in vacuo over sulfuric acid until used. This catalyst may be used with advantage for the reduction of alkylidene or aralkylidene cyanoacetic esters with the production of the corresponding mono-alkyl or aralkyl derivatives in almost theoretical yields.

Where the present process is applied to the hydrogenation of alkylidene or aralkylidene cyanoacetic esters, in which the alkylidene or aralkylidene group contains one or more unsaturated groups or doubly-bonded carbon atoms, the process generally results not only in the saturation of the vinyl linkage between the alkylidene group and the cyanoacetic group, but also in the saturation of any double bonds in the alkylidene radicals.

The invention will be further illustrated by the following specific examples, but it is not limited thereto.

*Example 1.* Isopropylidene cyanoacetic ester is dissolved in absolute alcohol, a palladium catalyst prepared as above, is added to the solution, and hydrogen is passed into the solution with vigorous agitation. After about 35 minutes the reduction is complete, and the catalyst is removed by filtration. The alcohol is removed from the filtrate by evaporation, and the residue is distilled. Isopropyl cyanoacetic ester, boiling at 215–219° C. (atmospheric pressure) is obtained.

*Example 2.* The methyl ester of 1-methyl-n-pentylidene cyanoacetic acid is dissolved in absolute alcohol and reduced with a palladium catalyst as in Example 1, the reduction being continued for about 85 minutes. The same product was also reduced with platinum in about 23 minutes. The reduced product, 1-methyl-n-amyl cyanoacetic methyl ester distills at 252–254° C. (atomspheric pressure) or 118–119° C./1 mm.

Platinum, or other members of the platinum-palladium family may be substituted for the palladium catalyst of the preceding examples with about equally good results.

In general, the process of the present invention involves the dissolving of the alkylidene cyanoacetic ester in a suitable inert solvent, which may advantageously be absolute alcohol, although other suitable solvents may be used, e. g. ether, and suspending the catalyst in the solution. Also, the reaction may be carried out by suspending the catalyst in the ester to be hydrogenated, with no solvent, with good results. The suspension, when the reduction is carried out, is substantially neutral, and it is not necessary to adjust its pH in any way. The process is applicable to any of the alkylidene cyanoacetic esters, including saturated as well as unsaturated derivatives, as well as primary and secondary derivatives. The hydrogenation of such products as citronellylidene cyanoacetic ester (from citronellal and cyanoacetic ester), Δ3-butenylidene cyanoacetic ester (from crotonaldehyde and cyanoacetic ester), and the condensation product of mesityl oxide and cyanoacetic ester gives the corresponding saturated mono-alkyl esters rather than the unsaturated mono-alkyl esters.

Not all hydrogenation catalysts are available for the catalytic reduction or hydrogenation of the alkylidene cyanoacetic esters to corresponding mono-alkyl esters, because the nitrile group is sensitive to the action of hydrogen. Such catalysts as copper chromite and nickel, while bringing about absorption of hydrogen, do not produce the desired mono-alkyl derivatives, at least insofar as we are at present aware. The catalysts which we have found effective are palladium and platinum, and other metals of their group; but there may be other catalysts as effective, or almost as effective, as these.

We claim:

1. The process of producing mono-alkyl and aralkyl cyanoacetic esters which comprises subjecting a compound from the class consisting of alkylidene and aralkylidene cyanoacetic esters to the action of hydrogen in the presence of a hydrogenation catalyst having an activity about the same as that of metals of the platinum and palladium family.

2. The process of producing mono-alkyl and aralkyl cyanoacetic esters which comprises catalytically hydrogenating a compound of the class consisting of alkylidene and aralkylidene cyanoacetic esters in the presence of a noble metal catalyst.

3. The process of producing mono-alkyl and aralkyl cyanoacetic esters which comprises subjecting a compound of the class consisting of alkylidene and aralkylidene cyanoacetic esters to the action of hydrogen in the presence of a platinum catalyst.

4. The process of producing mono-alkyl and aralkyl cyanoacetic esters which comprises catalytically hydrogenating a compound of the class consisting of alkylidene and aralkylidene cyanoacetic esters in the presence of a catalyst selected from the group of metals of the platinum and palladium family.

5. The process of producing mono-alkyl and aralkyl cyanoacetic esters which comprises dissolving a compound of the class consisting of alkylidene and aralkylidene cyanoacetic esters in an inert solvent, adding a catalyst consisting of palladium supported on charcoal, and passing hydrogen into contact with the solution.

6. The process of producing mono-alkyl and aralkyl cyanoacetic esters which comprises subjecting a compound of the class consisting of alkylidene and aralkylidene cyanoacetic esters to the action of hydrogen in the presence of palladium supported on charcoal.

7. The process of producing mono-alkyl and aralkyl cyanoacetic esters which comprises subjecting a compound of the class consisting of alkylidene and aralkylidene cyanoacetic esters to the action of hydrogen in the presence of a palladium catalyst.

ARTHUR C. COPE.
WALTER H. HARTUNG.
FRANK S. CROSSLEY.